United States Patent
Arai et al.

[11] Patent Number: 5,995,691
[45] Date of Patent: Nov. 30, 1999

[54] WAVEGUIDE TYPE GRATING DEVICE

[75] Inventors: Hideaki Arai; Ryoji Suzuki; Korenori Tamura; Hisato Uetsuka, all of Ibaraki, Japan

[73] Assignee: Hitachi Cable, Ltd., Tokyo, Japan

[21] Appl. No.: 09/070,935

[22] Filed: May 1, 1998

[30] Foreign Application Priority Data

Dec. 4, 1997 [JP] Japan ................................. 9-334439

[51] Int. Cl.⁶ ..................................................... G02B 6/34
[52] U.S. Cl. .............................. 385/37; 385/28; 385/31; 385/123; 385/27
[58] Field of Search .................................. 385/37, 27–31, 385/123, 124, 141, 142, 96, 98

[56] References Cited

U.S. PATENT DOCUMENTS 5,732,170  3/1998  Okude et al. ............................. 385/27

FOREIGN PATENT DOCUMENTS 0770890A  2/1997  European Pat. Off. .

*Primary Examiner*—Phan T. H. Palmer
*Attorney, Agent, or Firm*—McDermott, Will & Emery

[57] ABSTRACT

A waveguide type grating device according to the invention includes a quartz substrate, a cladding and two waveguides. Waveguides are arranged to provide an input port, an Add port, an output port, a Drop port, directional 3 dB couplers, core width-changing portions, and grating portions each interposed between core width-changing portions. The width of core is changed between each non-grating portion and each grating portion in an adiabatic structure, for example, a parabolic structure. For this structure, a waveguide type grating device is structured to suppress the increase in wavelength loss due to coupling from progressive propagation mode to regressive radiation mode, with less cost and smaller dimension.

10 Claims, 4 Drawing Sheets

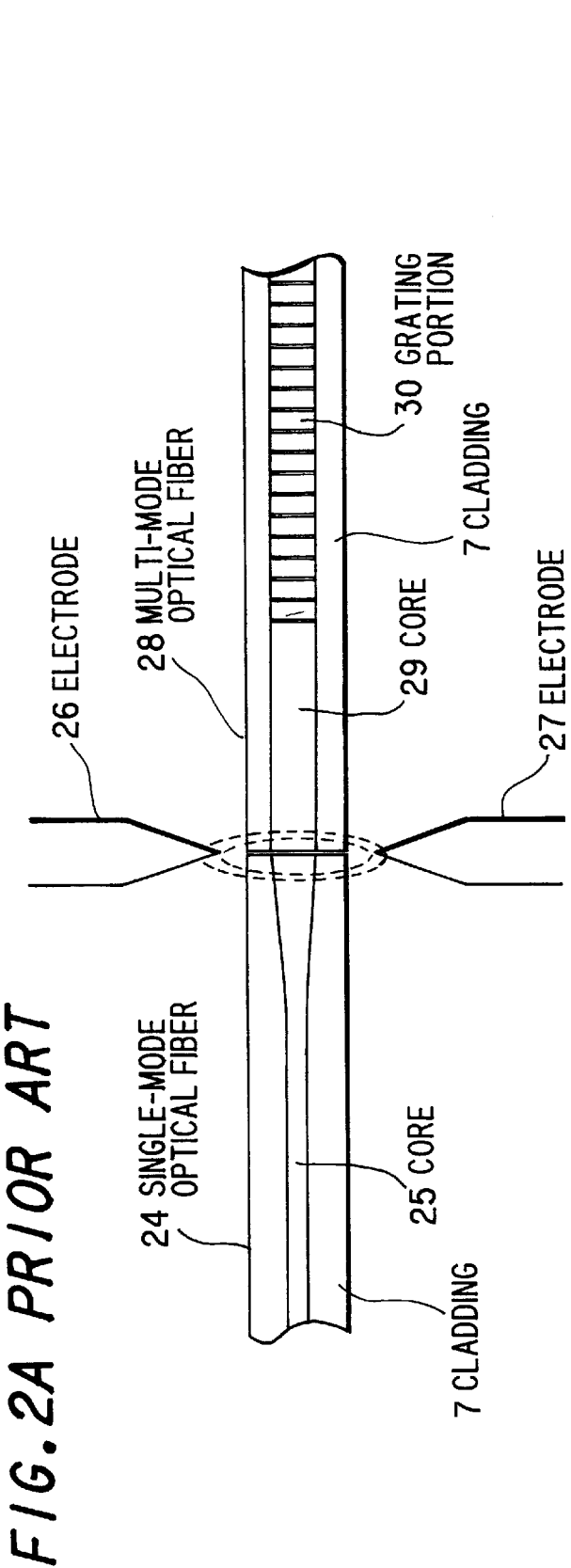
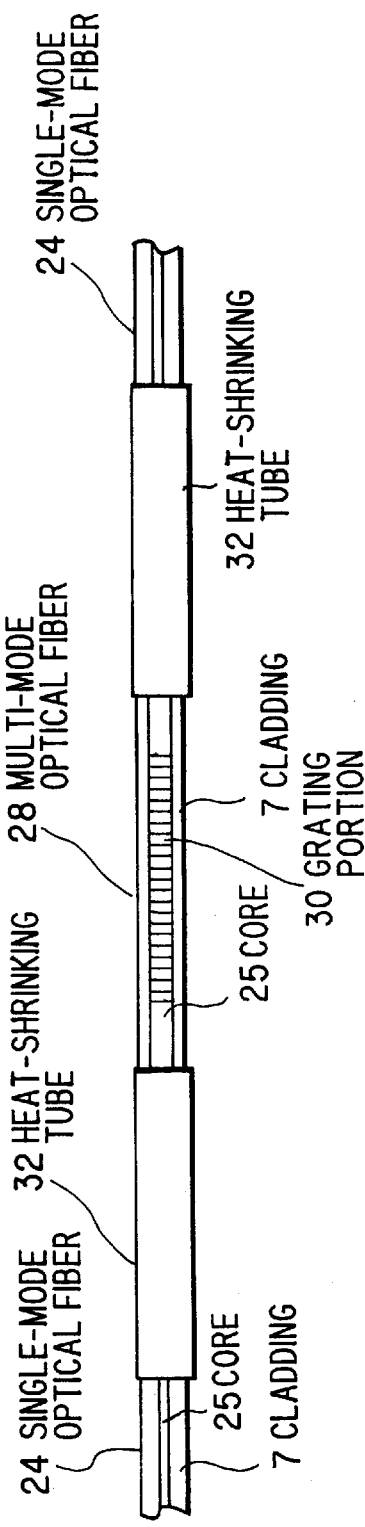
FIG. 2A PRIOR ART
FIG. 2B PRIOR ART

WAVEGUIDE TYPE GRATING DEVICE

FIELD OF THE INVENTION

This invention relates to a waveguide type grating device used for an optical filter, etc., and particularly to a waveguide type grating device suppressing the increase in wavelength loss on a side of a short wavelength of Bragg wavelength due to mode coupling from progressive propagation mode to regressive radiation mode.

BACKGROUND OF THE INVENTION

Bragg grating of refractive index modulation type is formed in an optical fiber consisting of $SiO_2$ glass with $GeO_2$ added whose refractive index can be increased by exposure to ultraviolet radiation. Bragg grating of this type is comparably easy to be produced and excellent in function, and thus has been developed extensively as a useful part for Add/Drop filter in optical wavelength multiplexed communication, dispersion compensator and optical sensor.

A conventional waveguide type grating device comprises a cladding provided on a quartz substrate and a core formed in the cladding for an optical wave guide. The core consists of a pair of non-grating portions and a grating portion interposed between the non-grating portions. The non-grating portions have an input port and an output port at outer ends, respectively.

The core in the conventional waveguide type grating device is formed of $GeO_2$—$SiO_2$ whose refractive index can be increased by exposure to ultraviolet radiation, while the cladding is free from $GeO_2$ added. Thus, modulation of the refractive index by ultraviolet irradiation is performed exclusively within the core. In such a grating device, light is confined to be propagated through the core but diffusion of light into the cladding is not prevented successfully.

Another grating device based on the same principle as the aforesaid conventional waveguide type grating device is an optical fiber grating in which a grating is formed by irradiating the core of optical fiber to ultraviolet rays and the core so treated is arranged between a pair of non-grating portions. In this optical fiber grating, too, light diffuses into the cladding as it is propagated, thus causing increase in wavelength loss. Various attempts have been made to avoid this, among which the most common and effective way is to use a grating formed in an optical fiber having higher ratio of propagated light confined within the core, for example, multi-mode optical fiber.

This method is found to be effective to suppress the increase in wavelength loss in shorter wavelength down to a negligible extent. In practical use, however, it is necessary to couple the multi-mode optical fiber with single mode optical fibers to which an optical signal is to be inputted and outputted. The single mode optical fiber differs from the multi-mode optical fiber in mode field diameter. This difference in diameter causes a significant wavelength loss at this coupling.

In order to suppress such wavelength loss at the coupling, TEC fusing process has been used in which the core diameter of single mode optical fiber is expanded gradually by heating so as to allow coupling.

For coupling a single mode fiber with a multi-mode fiber having a grating portion, the core of single mode fiber is heated by a pair of electrodes arranged in the neighborhood of the fiber at the position of coupling to expand the diameter of the core gradually up to that of the multi-mode fiber. Thereafter, the fused part of the single mode and multi-mode optical fibers is covered with a heat-shrinking tube to protect the fused part.

In an optical fiber grating using multi-mode and single mode optical fibers, however, the necessity of TEC fusing process results in higher costs, and the use of heat-shrinking tube of 40 mm in length which is longer than the grating portion of 10 to 30 mm results in increased total length, both causing problems.

Further, in a conventional waveguide type grating device, there is another problem of increase in wavelength loss, because light diffuses into cladding as it is propagated (that is, not confined within the core), thereby progressive propagation mode is coupled partly with regressive radiation mode to cause the increase in wavelength loss.

SUMMARY OF THE INVENTION

Accordingly, it is an object of the invention to provide a waveguide type grating device which suppresses the increase in wavelength loss due to mode coupling from progressive propagation mode to regressive radiation mode, costs less and is smaller in total size.

According to the first feature of the invention, a waveguide type grating device comprises:
a substrate;
a core portion which is formed on the substrate or on a lower cladding layer formed on the substrate and has a higher refractive index than the substrate or the lower cladding layer; and
an upper cladding layer having a lower refractive index than the core portion;
the core portion comprising a pair of non-grating portions and a grating portion which is interposed therebetween and wider than either of the non-grating portions;
the grating portion being formed by modulating a refractive index thereof by exposure to ultraviolet radiation; and
the non-grating portions providing an input port and an output port at outer ends thereof for input and output of an optical signal, respectively.

According to the second feature of the invention, a waveguide type grating device comprises:
a substrate;
a core portion which is formed on the substrate or on a lower cladding layer formed on the substrate and has a higher refractive index than the substrate or the lower cladding layer; and an upper cladding layer having a lower refractive index than the core portion;
the core portion comprising a pair of non-grating portions, a grating portion which is interposed therebetween and wider than either of the non-grating portions, and a pair of core width-changing portions in which the core width gradually changes;
the grating portion being coupled with the non-grating portions by way of the core width-changing portions;
the grating portion being formed by modulating a refractive index thereof by exposure to ultraviolet radiation; and
the non-grating portions providing an input port and an output port at outer ends thereof for input and output of an optical signal, respectively.

According to the third feature of the invention, a waveguide type grating device comprises:
a waveguide having an input port, an Add port, a Drop port and an output port, wherein the waveguide comprises;
a pair of cores, each consisting of a pair of non-grating portions and a grating portion interposed therebetween and being wider than either of the non-grating portions, a first directional coupler having two inputs and two outputs, coupled with the cores providing the input port and the Drop port, and a second directional coupler having two inputs and two outputs, coupled with the cores providing the Add port and the output port, the grating portions being formed by modulating a refractive index of the cores by exposure to ultraviolet radiation.

According to the fourth feature of the invention, a waveguide type grating device comprises:

a substrate;

a pair of cores formed on the substrate or on a lower cladding layer formed on the substrate and having a higher refractive index than the substrate or the lower cladding layer; and an upper cladding layer having a lower refractive index than the cores;

wherein:

the pair of cores each comprises a pair of non-grating portions and a grating portion interposed therebetween and wider than either of the non-grating portions;

the pair of cores provide an input port and an Add port at respective first ends, a Drop port and an output port at respective second ends, a first directional coupler having two inputs and two outputs, and a second directional coupler having two inputs and two outputs;

the first directional coupler being coupled with a non-grating portion of a first core of the pair of cores having the input port at distal end and with a non-grating portion of a second core of the pair of cores having the Drop port at distal end, the second directional coupler being coupled with a non-grating portion of the first core having the Add port at distal end and with a non-grating portion of the second core having the output port at distal end, and the grating portions being formed by modulating refractive index of the cores by exposure to ultraviolet radiation.

BRIEF DESCRIPTION OF THE DRAWINGS

The invention will be explained in more detail in conjunction with appended drawings, wherein:

FIG. 2A is an explanatory view showing a TEC fusing process for forming an optical fiber grating;

FIG. 2B is an explanatory view showing a conventional waveguide type grating device;

DESCRIPTION OF THE PREFERRED EMBODIMENT

Before explaining a waveguide type grating device in a preferred embodiment according to the invention, the aforementioned conventional waveguide type grating device and optical fiber grating will be explained in FIGS. 1A to 1C, and FIGS. 2A and 2B.

Figure 1A:
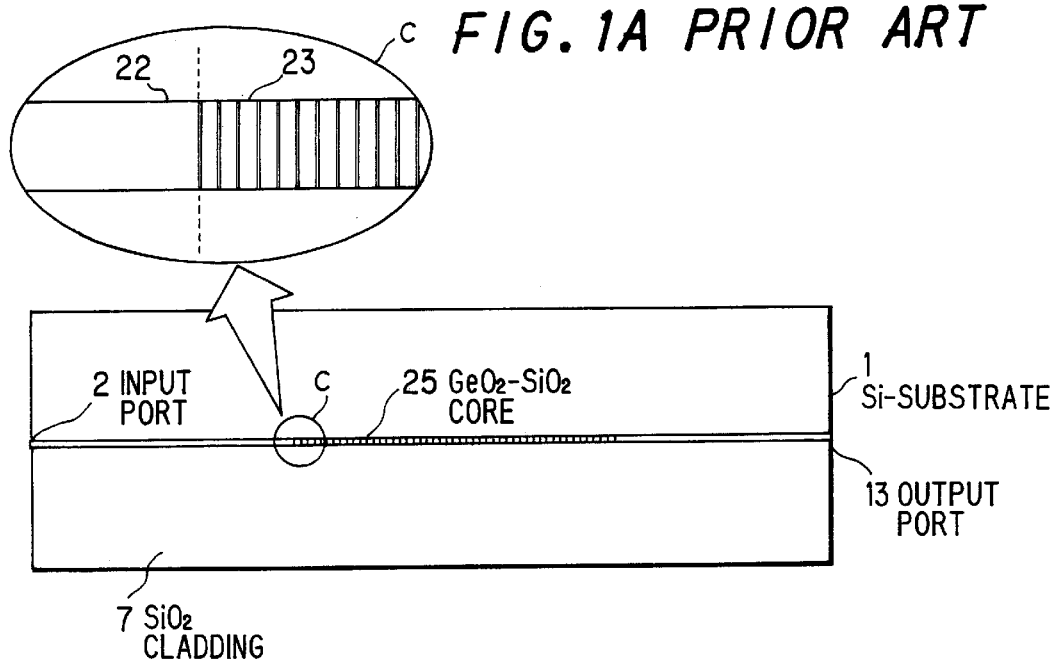
FIG. 1A is a plan view showing a conventional waveguide type grating device.
Figure 1B:
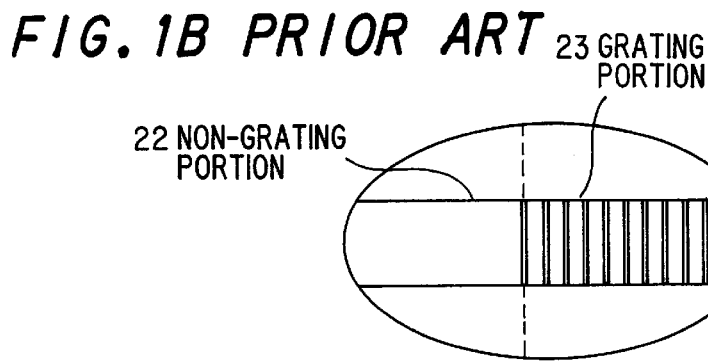
FIG. 1B is an enlarged view of an encircled portion in FIG. 1A.

FIGS. 1A and 1B show a conventional waveguide type grating device. This conventional device is provided with a quartz substrate 1, a cladding 7 on substrate 1, and core 25 formed in cladding 7 for optical waveguide. Core 25 consists of non-grating portions 22 in the terminal regions and grating portion 23 in the central region. Input port 2 and output port 13 are provided at both ends of core 25, included in non-grating portions 22.

Figure 1C:
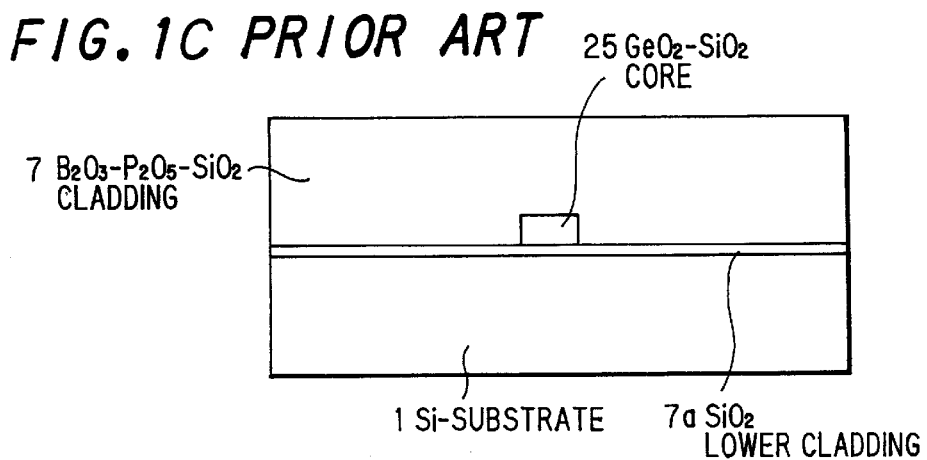
FIG. 1C is a cross-sectional view showing a conventional waveguide type grating device.

FIG. 1C shows the conventional waveguide type grating device in a cross-sectional view along the plane across core 25. Quartz substrate 1 is coated with lower cladding 7a of $SiO_2$ which is further covered with cladding 7. Core 25 formed of $GeO_2$—$SiO_2$ is formed on lower cladding 7a along the longitudinal line of the latter.

In the conventional waveguide type grating device, core 25 is formed with $GeO_2$—$SiO_2$, refractive index of which can be increased by exposure to ultraviolet radiation, while cladding 7 is free from $GeO_2$. Thus, ultraviolet irradiation causes modulation of refractive index exclusively within core 25 so that light is confined within core 25 as it is propagated. It is difficult, however, to prevent light completely from diffusing into cladding 7.

FIG. 2A shows TEC fusion process and FIG. 2B shows a conventional optical fiber grating produced by TEC fusion process. For coupling single mode optical fiber 24 and multi-mode optical fiber 28 including grating portion 30, as shown in FIG. 2A, a pair of electrodes 26 and 27 are arranged in the opposite positions along the coupling position, core 25 of single mode optical fiber 24 is heated by the electrodes to expand the diameter gradually to the same diameter as that of core 29 of multi-mode optical fiber 28 so that coupling is effected.

In an optical fiber thus produced, as shown in FIG. 2B, the fused portions of single mode fibers 24 and multi-mode fiber 28 are covered with heat-shrinking tubes 32 to protect the fused portions.

Figure 3:
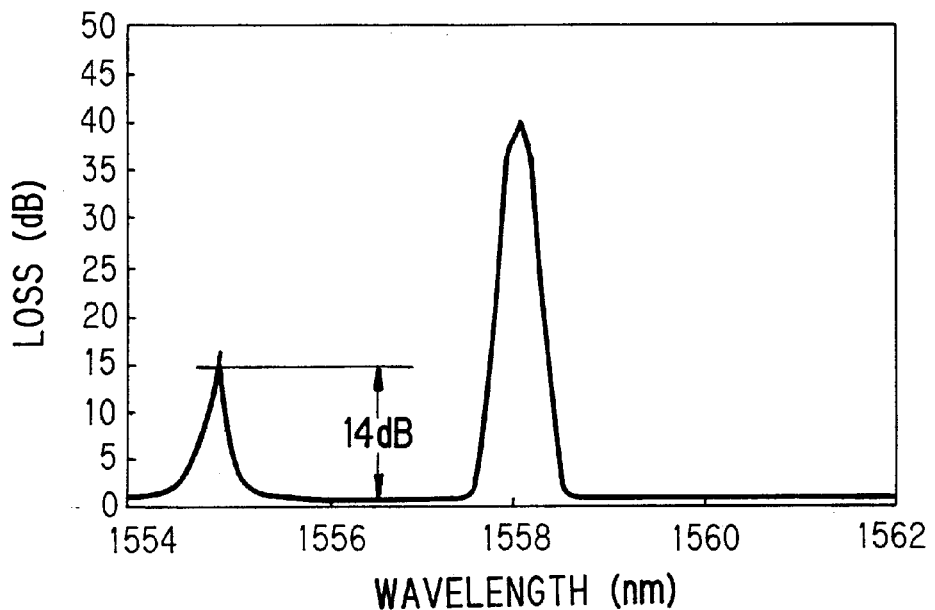
FIG. 3 is a graph showing transmission spectrographic characteristics of a conventional waveguide type grating device.

FIG. 3 shows the wavelength characteristics of a conventional waveguide type grating device where grating portion 23 is formed in core 25 having a height of 6 μm, a width of 6 μm and a relative refractive index differenceΔ of 0.8%. Cut-off ratio at 1558 nm, Bragg wavelength, for this conventional waveguide type grating device is as high as about 40 dB, but increase in wavelength loss up to 14 dB is observed at wavelength of about 1555 nm due to partial coupling of progressive propagation mode with regressive radiation mode. This increase in wavelength loss is a problem with the conventional grating device.

Next, a waveguide type grating device in a preferred embodiment according to the invention will be explained in FIGS. 4A, 4B and 4C.

Figure 4C:
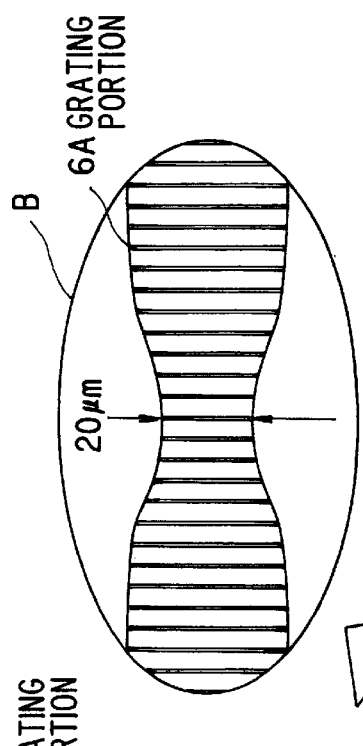
FIG. 4B and FIG. 4C are enlarged views of encircled portions in FIG. 4A.
Figure 4B:
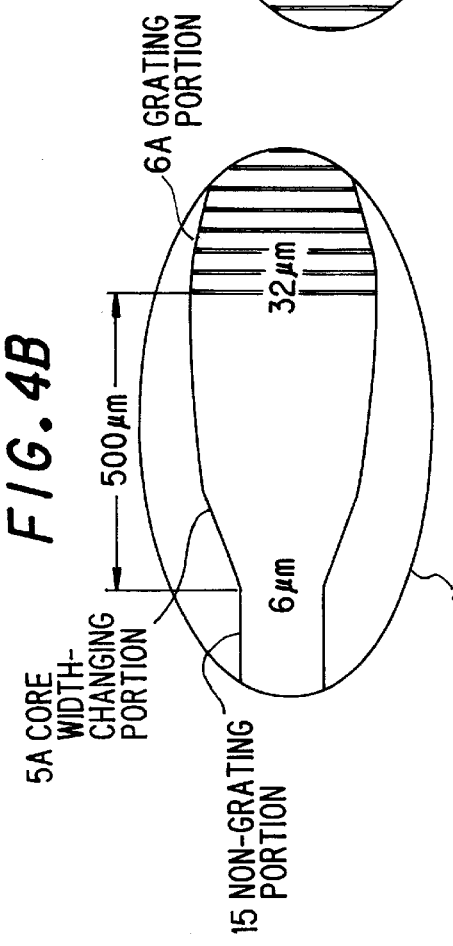
Figure 4A:
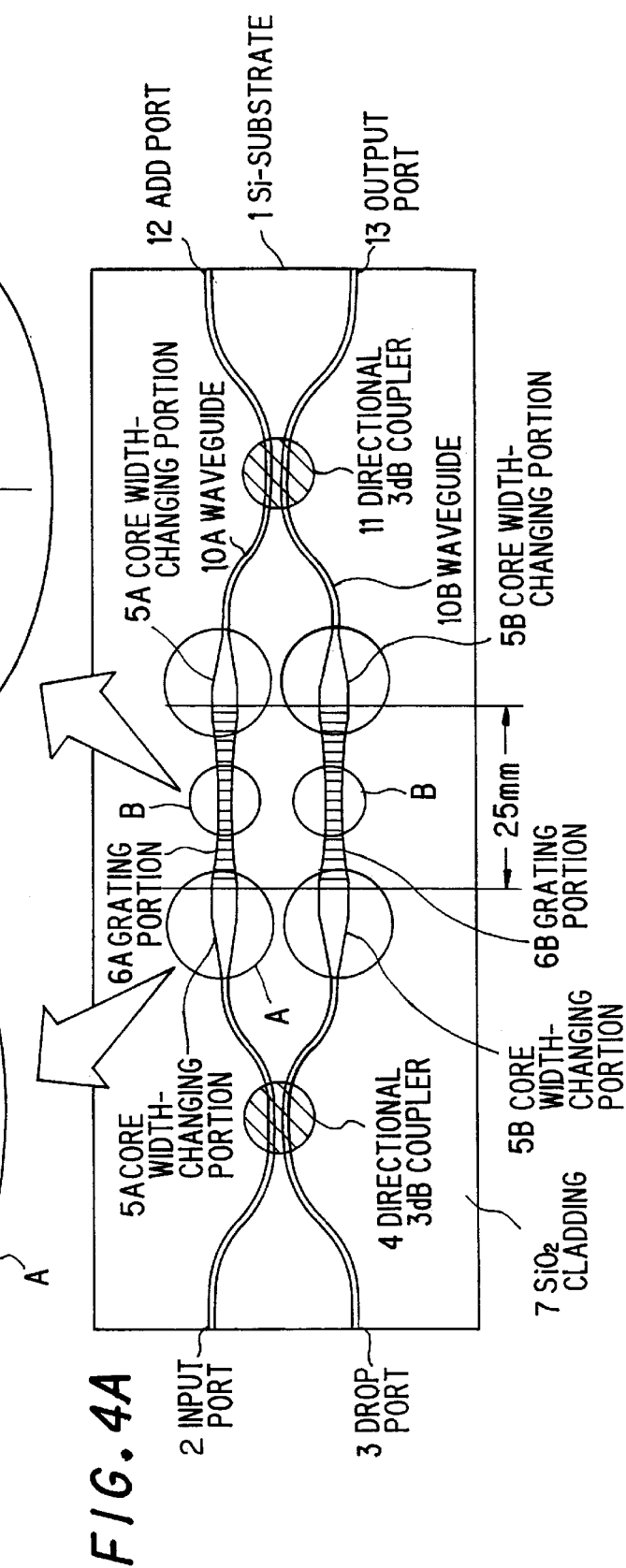
FIG. 4A is an explanatory view of a waveguide type grating device in a preffered embodiment according to the invention.

FIG. 4A shows the whole of a waveguide type grating device in the invention. FIG. 4B shows the core width-changing portion 5A provided around the border between the grating portion 6A and the non-grating portions 15

(non-grating portions). FIG. 4C shows the central region of the grating portion 6A. The waveguide type grating device is provided with quartz substrate 1, cladding 7 mounted on quartz substrate 1, two waveguides (cores) 10A and 10B placed in cladding 7 and directional 3 dB couplers 4 and 11. Waveguide 10A has input port 2 and Add port 12 at outer ends. Waveguide 10B has output port 13 and Drop port 3 at outer ends. Directional 3 dB couplers 4 and 11, each having two inputs and two outputs, are arranged at a position near input port 2 and Drop port 3 and at aposition near Add port 12 and output port 13, respectively, on waveguides 10A and 10B. Directional 3 dB couplers 4 and 11 are coupled with waveguides 10A and 10B, wherein directional 3 dB coupler 4 has two inputs receiving signals from input port 2 and grating portion 6B and has two outputs transmitting signals to grating portion 6A and Drop port 3, and directional 3 dB coupler 11 has two inputs receiving signals from grating portion 6A and Add port 12 and has two outputs for transmitting signals to output port 13 and grating portion 6B. In the middle region of waveguide 10A, a pair of core width-changing portions 5A and grating portion 6A are provided, wherein grating portion 6A is interposed between core width-changing portions 5A. In the middle region of waveguide 10B, a pair of core width-changing portions 5B and grating portion 6B are provided, wherein grating portion 6B is interposed between core width-changing portions 5B.

Core width-changing portions 5A and core width-changing portions 5B are similar in structure and function. Grating portions 6A and 6B are also similar in structure and function, both functioning as Add/Drop filters.

In the structure above, it is assumed that grating portions 6A and 6B reflect a signal of wavelength $\lambda_1$ among multiplexed wavelengths $\lambda_1$ to $\lambda_n$ and transmit those of wavelengths $\lambda_2$ to $\lambda_n$. Any optical signal of wavelength $\lambda_1$ to $\lambda_n$ inputted into input port 2 is divided into two signals by means of directional 3 dB coupler 4. Optical signals of wavelength $\lambda_1$ are reflected exclusively by grating portions 6A and 6B, respectively, and return to directional 3 dB coupler 4, where the signals are coupled and outputted from Drop port 3. Meanwhile, optical signals of wavelengths $\lambda_2$ to $\lambda_n$ pass through grating portions 6A and 6B, respectively, to reach directional 3 dB coupler 11. At the same time, an optical signal of wavelength $\lambda_1$ inputted from Add port 12 is divided into two signals, which are reflected by grating portions 6A and 6B, respectively, and return to directional 3 dB coupler 11. These optical signals of wavelength $\lambda_1$ and optical signals of wavelengths $\lambda_2$ to $\lambda_n$ are coupled by means of directional 3 dB coupler 11 and outputted from output port 13 as an optical signal having multiplexed wavelengths of $\lambda_1$ to $\lambda_n$.

FIG.4B shows corewidth-changing portion 5A in magnification. In FIG.4B, core width-changing portion 5A is arranged between grating portion 6A and non-grating portion 15, in which the core width is changed from 6 μm in non-grating portion 15 up to 32 μm. The structure of core width-changing portion 5A in which the core width changes gradually is an adiabatic structure causing no loss of optical signals, particularly aparabolic structure as shown in Formula (1):

$$W(Z)=(2\alpha Z\lambda/N_{eff}+W_0^2)^{1/2} \quad (1)$$

where $W_0$ represents the width of non-grating portion, $\lambda$ represents the wavelength at or in the vicinity of the grating portion mentioned above, $N_{eff}$ represents equivalent refractive index, $\alpha$ represents a constant $0<\alpha\leq 1$, Z represents a position on the axis of light propagation assumed to be 0 at the end of width-changing portion toward the non-grating portion and positive toward the grating portion, and W(Z) represents the width of core at position Z.

As shown in FIG. 4B, the length of region required for core width changing in the waveguide type grating device is only 500 μm, much shorter than that in the conventional fiber grating using TEC fusing process shown in FIGS. 2A and 2B which requires the use of a heat-shrinking tube of 40 mm in length.

FIG. 4C is an enlarged view of the middle portion of grating portions 6A and 6B. The widths of grating portions 6A and 6B are narrowed gradualy in accordance with Gauss function, narrowest in the center where they are 20 μm wide.

Next, a process of manufacturing waveguide type grating devices according to the invention will be described. At first, a waveguide device is produced by common methods for producing a quartz glass waveguide such as one consisting of flame deposition, photolithography and dry etching. After a waveguide device is placed for aging in hydrogen gas of 150 atm. at ambient temperature for a week, grating is formed on the waveguide device by phase mask method (a waveguide device under a phase mask is irradiated to EXIMA laser beam), well known as a method for producing a fiber grating. Grating is formed with a pitch such that Bragg wavelength be 1558 nm. The core is made of $GeO_2$—$SiO_2$ having a refractive index of 1.4692; the cladding is made of $SiO_2$—$B_2O_3$—$P_2O_5$ having a refractive index of 1.458; the substrate is made of $SiO_2$ having a refractive index of 1.458. Waveguide type grating devices according to the invention can be manufactured by the process mentioned above, without using any laborious process such as TEC fusing process and without any additional step for production to a conventional manufacturing process of waveguide device.

Figure 5:
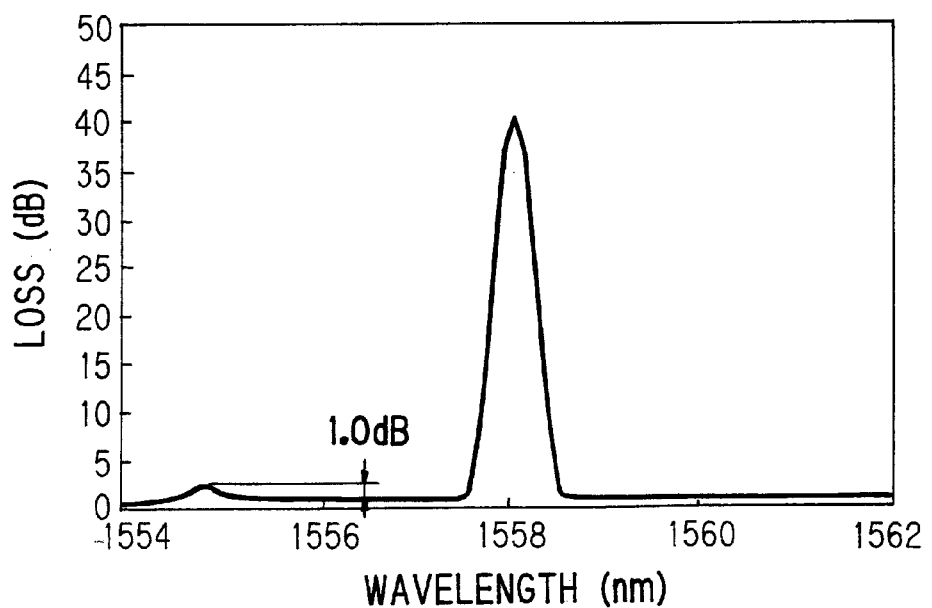
FIG. 5 is a graph showing transmission spectrographic characteristics of the waveguide type grating device in the preffered embodiment according to the invention.

FIG.5 shows the wavelength characteristics for optical signals which are supplied to input port 2 of the waveguide type grating device and outputted from output port 13 thereof. Input light having wavelength of 1558 nm, Bragg wavelength, is reflected by grating portion 6A or 6B so that it is cut off to provide a cut-off ratio of about 40 dB, effective enough level. A small peak at wavelength of about 1555 nm is shown in FIG. 5 to be accounted for by coupling progressive propagation mode to regressive radiation mode, which is as small as 1 dB, remarkably less compared with 14 dB for a conventional waveguide type grating device shown in FIG. 3.

Further to the description of the preferred embodiment of waveguide type grating device according to the invention, when compatibility with optical fibers used for communication, and dimension of devices are considered, it is preferred that relative refractive index difference Δ between core and cladding is 0.7 to 0.9%, core width in non-grating portions at input port and output port is 4 to 9.5 μm. Core width in grating portions is preferably 0 to 40 μm for minimizing radiation mode coupling and avoiding increase of dimensions.

Silicon or glass may be used for substrate in place of $SiO_2$. Flame brushing process in which defects caused by oxygen shortage are increased in a device by heating it with oxygen-hydrogen burner may be replaced by a treatment in which it is placed in high pressure hydrogen gas at ambient temperature. Two-beam light interference method may be used in place of phase mask method for forming grating.

Waveguide type grating devices according to the invention can be used for Add/Drop filter, dispersion compensator, gain equalizer for EDFA and optical cut-off filter.

As mentioned above, the wavelength loss on a side of a short wavelength of Bragg wavelength due to coupling of progressive propagation mode to regressive radiation mode observed in waveguide type grating devices can be reduced by waveguide type grating devices according to the invention, owing to the width of core in grating portion expanded so that input light is completely confined within the core, as well as the structure in which the core widths in non-grating portions and grating portion are changed so as to keep adiabatic profiles. In addition, devices according to the invention can be kept smaller in their dimensions by virtue of parabolic structure of the core width-changing portions which is adiabatic.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A flat plate waveguide type grating device, comprising:
   a substrate;
   a core portion which is formed on said substrate or on a lower cladding layer formed on said substrate and has a higher refractive index than said substrate or said lower cladding layer; and
   an upper cladding layer having a lower refractive index than said core portion;
   said core portion comprising a pair of non-grating portions, a grating portion which is interposed therebetween and wider than either of said non-grating portions, and a pair of photolithographically formed core width-changing portions in which the core width gradually changes;
   said grating portion being coupled with said non-grating portions by way of said core width-changing portions;
   said grating portion being formed by modulating a refractive index thereof by exposure to ultraviolet radiation; and
   said non-grating portions providing an input port and an output port at outer ends thereof for input and output of an optical signal, respectively.

2. A waveguide type grating device, according to claim 1, wherein:
   said core width-changing portions have each adiabatic structure free from loss in optical signals.

3. A waveguide type grating device, according to claim 1, wherein:
   said core portion and said substrate or said lower or upper cladding layer differ in refractive index so as to give a relative refractive index difference 0.7 to 0.9%;
   said non-grating portions have a width of 4.0 to 9.5 μm; and
   said grating portion has a width of 6 to 40 μm.

4. A waveguide type grating device, comprising:
   a substrate;
   a core portion which is formed on said substrate or on a lower cladding layer formed on said substrate and has a higher refractive index than said substrate or said lower cladding layer; and
   an upper cladding layer having a lower refractive index than said core portion;
   said core portion comprising a pair of non-grating portions, a grating portion which is interposed therebetween and wider than either of said non-grating portions, and a pair of core width-changing portions in which the core width gradually changes;
   said grating portion being coupled with said non-grating portions by way of said core width-changing portions;
   said grating portion being formed by modulating a refractive index thereof by exposure to ultraviolet radiation;
   said non-grating portions providing an input port and an output port at outer ends thereof for input and output of an optical signal, respectively;
   said core width-changing portions have each adiabatic structure free from loss in optical signals; and
   said adiabatic structure is a parabolic structure represented by an equation:

$$W(Z) = (2\alpha Z \lambda / N_{eff} + W_0^2)^{1/2}$$

where $W_0$ represents the width of non-grating portion, $\mu$ represents the wavelength at or in the vicinity of the grating portion, $N_{eff}$ represents an equivalent refractive index, $\alpha$ represents a constant $0 < \alpha \leq 1$, $Z$ represents a position on the axis of light propagation assumed to be 0 at the end of width-changing portion toward the non-grating portion and positive toward the grating portion, and $W(Z)$ represents the width of core at position $Z$.

5. A waveguide type grating device according to claim 4, wherein:
   said grating portion is the narrowest in the middle portion and the widest at both ends.

6. The waveguide type grating device, comprising:
   a substrate;
   a core portion which is formed on said substrate or on a lower cladding layer formed on said substrate and has a higher refractive index than said substrate or said lower cladding layer; and
   an upper cladding layer having a lower refractive index than said core portion;
   said core portion comprising a pair of non-grating portions, a grating portion which is interposed therebetween and wider than either of said non-grating portions, and a pair of core width-changing portions in which the core width gradually changes;
   said grating portion being coupled with said non-grating portions by way of said core width-changing portions;
   said grating portion being formed by modulating a refractive index thereof by exposure to ultraviolet radiation;
   said non-grating portions providing an input port and an output port at outer ends thereof for input and output of an optical signal, respectively; and
   said grating portion is the narrowest in the middle portion and the widest at both ends.

7. A waveguide type grating device, comprising:
   a substrate;
   a core portion which is formed on said substrate or on a lower cladding layer formed on said substrate and has a higher refractive index than said substrate or said lower cladding layer; and
   an upper cladding layer having a lower refractive index than said core portion;
   said core portion comprising a pair of non-grating portions, a grating portion which is interposed therebetween and wider than either of said non-grating portions, and a pair of core width-changing portions in which the core width gradually changes;

said grating portion being coupled with said non-grating portions by way of said core width-changing portions;

said grating portion being formed by modulating a refractive index thereof by exposure to ultraviolet radiation;

said non-grating portions providing an input port and an output port at outer ends thereof for input and output of an optical signal, respectively;

said core portion and said substrate or said lower or upper cladding layer differ in refractive index so as to give a relative refractive index difference 0.7 to 0.9%;

said non-grating portions have a width of 4.0 to 9.5 $\mu$m;

said grating portion has a width of 6 to 40 $\mu$m; and said grating portion is the narrowest in the middle portion and the widest at both ends.

8. A waveguide type grating device, comprising:

a substrate;

a core portion which is formed on said substrate or on a lower cladding layer formed on said substrate and has a higher refractive index than said substrate or said lower cladding layer; and an upper cladding layer having a lower refractive index than said core portion;

said core portion comprising a pair of non-grating portions, a grating Portion which is interposed therebetween and wider than either of said non-grating portions, and a pair of core width-changing portions in which the core width gradually changes;

said grating portion being coupled with said non-grating portions by way of said core width-changing portions;

said grating portion being formed by modulating a refractive index thereof by exposure to ultraviolet radiation;

said non-grating portions providing an input port and an output port at outer ends thereof for input and output of an optical signal, respectively;

said core width-changing portions have each adiabatic structure free from loss in optical signals; and said grating portion is the narrowest in the middle portion and the widest at both ends.

9. A waveguide type grating device, comprising:

a substrate;

a pair of cores formed on said substrate or on a lower cladding layer formed on said substrate and having a higher refractive index than said substrate or said lower cladding layer; and an upper cladding layer having a lower refractive index than said cores;

wherein:

said pair of cores each comprises a pair of non-grating portions and a grating portion interposed therebetween and wider than either of said non-grating portions;

said pair of cores provide an input port and an Add port at respective first ends, a Drop port and an output port at respective second ends, a first directional coupler having two inputs and two outputs, and a second directional coupler having two inputs and two outputs;

said first directional coupler being coupled with a non-grating portion of a first core of said pair of cores having said input port at distal end and with a non-grating portion of a second core of said pair of cores having said Drop port at distal end;

said second directional coupler being coupled with a non-grating portion of said first core having said Add port at distal end and with a non-grating portion of said second core having said output port at distal end; and said grating portions being formed by modulating refractive index of said cores by exposure to ultraviolet radiation.

10. A waveguide type grating device, comprising:

a waveguide having an input port, an Add port, a Drop port and an output port, wherein said waveguide comprises;

a pair of cores, each consisting of a pair of non-grating portions and a grating portion interposed therebetween and being wider than either of said non-grating portions;

a first directional coupler having two inputs and two outputs, coupled with said cores providing said input port and said Drop port; and a second directional coupler having two inputs and two outputs, coupled with said cores providing said Add port and said output port;

said grating portions being formed by modulating a refractive index of said cores by exposure to ultraviolet radiation.

* * * * *